Feb. 25, 1964    E. WEINBRENNER ETAL    3,122,164
APPARATUS FOR MIXING MEASURED PROPORTIONS OF INGREDIENTS
Filed June 30, 1960    2 Sheets-Sheet 1

INVENTORS:
ERWIN WEINBRENNER, PETER HOPPE, KARL BREER.
BY
Clelle W. Upchurch
ATTORNEY Feb. 25, 1964 E. WEINBRENNER ETAL 3,122,164
APPARATUS FOR MIXING MEASURED PROPORTIONS OF INGREDIENTS
Filed June 30, 1960 2 Sheets-Sheet 2
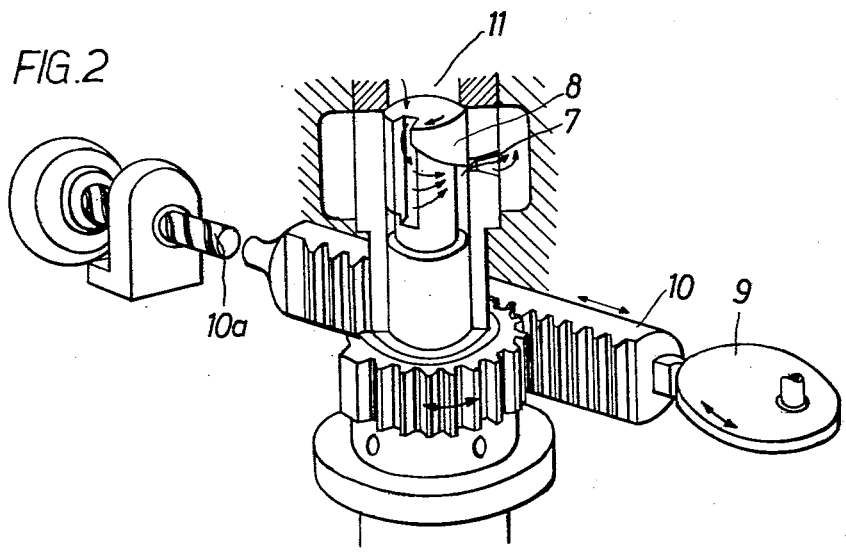
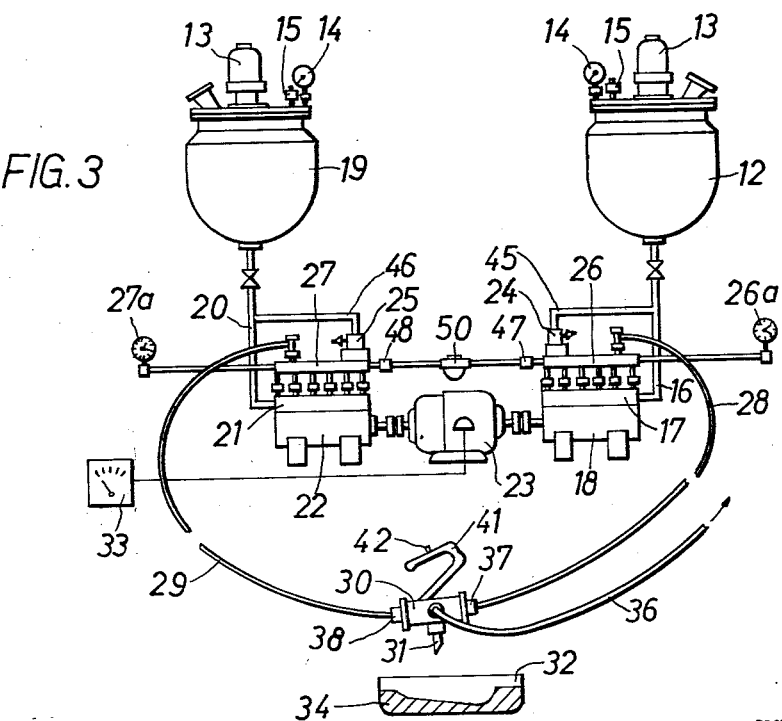
INVENTORS:
ERWIN WEINBRENNER, PETER HOPPE, KARL BREER.
BY
Clelle W. Upchurch
ATTORNEY

United States Patent Office 3,122,164
Patented Feb. 25, 1964

3,122,164
APPARATUS FOR MIXING MEASURED
PROPORTIONS OF INGREDIENTS
Erwin Weinbrenner, Leverkusen, Peter Hoppe, Troisdorf, and Karl Breer, Cologne-Flittard, Germany, assignors to Farbenfabriken Bayer Aktiengesellschaft, Leverkusen, Germany, a corporation of Germany
Filed June 30, 1960, Ser. No. 39,974
Claims priority, application Germany July 3, 1959
6 Claims. (Cl. 137—563)

This invention relates to an apparatus for measuring and mixing components and more particularly to an apparatus for mixing chemically reactive components used in the preparation of plastics.

In the production of certain types of plastics, several components under different delivery pressures are injected into a mixing chamber at delivery pressures which are greater than the opening and closing pressures of the injection-type nozzles used in conjunction with the mixing chamber. These injection-type nozzles are adjustable in that the pressure at which they open or close may be adjusted. However, it is the practice to adjust the nozzles for different ingredients to open and close at the same pressure. This permits the nozzles to open at the same time, thus introducing the different ingredients which are under different pressures into the mixing chamber, from which the intimately mixed reaction mass is shortly thereafter discharged. To operate mixing devices of this type intermittently and especially when ingredients which react rapidly are mixed, of course, it is necessary to stop the apparatus from time to time, for example, at the end of each mixing period. This has been heretofore accomplished by permitting the pressure in the pump delivery pipes of the different components to decrease to the pump inlet pressure by utilizing pressure-relief devices arranged in a by-pass pipe between the suction and delivery chambers of the pumps and which are connected to the change-over device of the pumps.

This procedure of permitting the pressure to decrease to the pump inlet pressure results in incomplete mixing of the different components for the reason that a quantity of the components remains in the pressure pipes in front of the nozzles under a sufficiently high pressure to cause the injection nozzle to remain open thus permitting this quantity of the components to enter the mixing chamber. This results because the components, which are under different delivery pressures require different periods of time for the pressure to drop to the closing pressures of the injection nozzles.

This difficulty has been overcome to a certain extent by using delay relays or contact manometers to switch off the motors driving the pumps, and thus allow for the differences in time required for the pressure to drop to the closing pressures of the nozzles. The time compensation, however, was incomplete since the accuracy of the electrically dependent changeover was such that measurement inaccuracies of up to 5% resulted and thus greatly reduced the desired economic production.

It is, therefore, an object of this invention to provide an improved apparatus for measuring and mixing liquid ingredients. It is another object of this invention to provide an apparatus for intermittently mixing predetermined proportions of different ingredients. It is a further object of this invention to provide an improved apparatus for introducing known quantities of ingredients into a mixing apparatus under different pressures. It is a still further object of this invention to provide an apparatus for simultaneously stopping the delivery of different ingredients to a mixing chamber, which ingredients are being delivered to said chamber under substantially different pressures. It is an auxiliary object of this invention to provide an apparatus which permits the pressure in different pump discharge lines to reach the same pressure at precisely the same point in time.

The foregoing objects and others which will become apparent from the following description taken in conjunction with the accompanying drawings are accomplished in accordance with the invention, generally speaking, by providing apparatus for reducing the delivery pressures of different ingredients being conveyed to a mixing chamber through pressure responsive injection nozzles by so regulating the delivery pressures that the shut off pressure of all the injection nozzles is reached simultaneously. More particularly, this invention contemplates an apparatus for carrying out a process which includes the mixing of a plurality of ingredients in known proportions by a continuous process, the proportions being determined by injecting for a definite period of time under a known pressure the different ingredients into a mixing chamber and simultaneously stopping the flow of the different ingredients into the mixing chamber so that none of the ingredients will remain in the chamber without the presence of the correct proportion of the other ingredients after the flow into the chamber has ceased.

It is essential that the delivery to the mixing chamber of each of the ingredients stops at the same time for the reason that when one ingredient is introduced after the remaining ingredients have already been stopped, the small portion of this ingredient will remain in the chamber and thus when the apparatus is again operated, the proportions of ingredients will not be in accordance with that desired and in some instances the product will contain areas where only one ingredient is present, thus producing a product which contains flaws.

The apparatus of this invention will become more apparent in conjunction with the accompanying drawings in which like reference characters indicate like parts and in which:

FIGURE 2 is a perspective view of one means of regulating the pressure within the delivery pipes to the mixing chamber in accordance with this invention; and FIGURE 3 is a diagram of the complete system in accordance with this invention.

Figure 1:
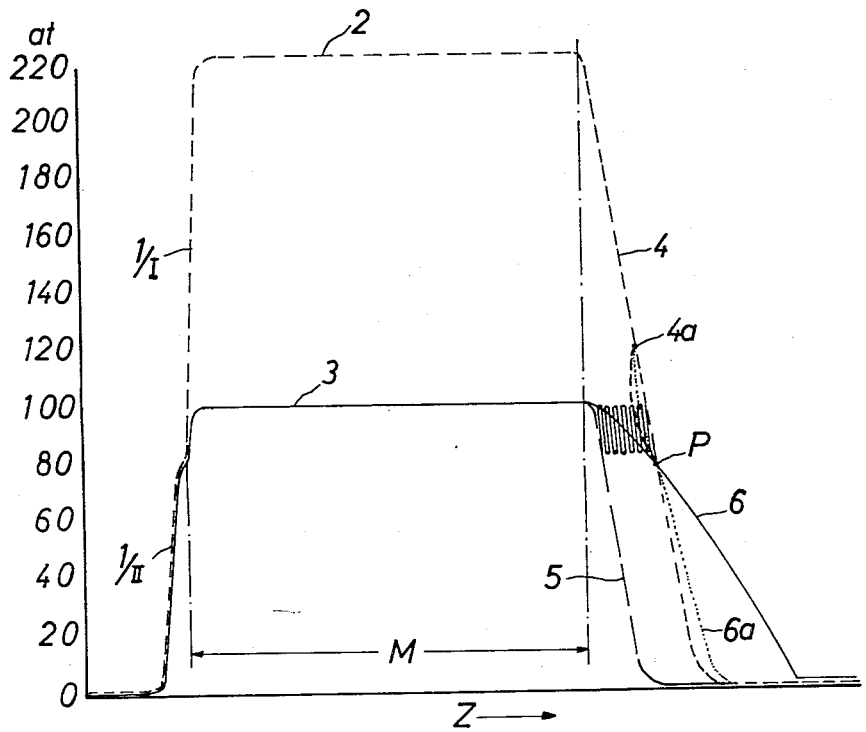
FIGURE 1 is a plot of pressure versus time for two different components of a system, introduced into a mixing device.

As stated previously, it is essential that the injection nozzles close at precisely the same time for all of the components. This requires the time period for the lower pressure component to drop to the closing pressure of the nozzle to be equal to the time period for the higher pressure component to drop to the closing pressure of the nozzle.

The arrangement for carrying out a process such as this comprises a time controlled relief valve in a recycling line of each component that is delivered to the mixing chamber. The control rod of each of the relief valves comprises adjustable stops for regulating the cross-sectional opening of the valve, thus regulating the pressure in the delivery line to the injection nozzles. The pressure relief valves may be responsive directly to the shutting down of the motor which drives the pump or indirectly by being responsive to contact manometers connected to the pressure or delivery chambers of the pumps. The connection of the valves to the different means to which they are responsive may be accomplished by electro-pneumatic driving means. By the latter method, the actuation of the relief valve of the low pressure component is delayed.

In the curve of FIGURE 1, the working or delivery pressure (P) of a two component system (I and II) are plotted against the working time z. Although the apparatus of this invention and the curves of FIGURE 1 are applicable for the mixing of any liquids or any number of liquids having any viscosity, for the purpose of illustration the following specific example is used:

Component I 100.0 parts by weight of a polyether-activator mixture with a viscosity of about 500 cp. (25° C.), and consisting of:

95.2 parts by weight of a polyether prepared by addition of propylene oxide to trimethylol propane (OH number 56),
0.4 part by weight of N,N'-trimethylol-β-aminoethyl-piperazine,
1.5 parts by weight of a siloxane-ethylene oxide copolymer as described in U.S. Patent 2,834,748,
2.9 parts by weight of water.

Component II 45.3 parts by weight of toluylene diisocyanate containing the 2,4- and 2,6-isomers in the ratio 80/20, viscosity 3 cp. (25° C.).

The delivery output of the piston pump for conveying the Component I is 9000 cc./min. in the present case for a working temperature of 18 to 25° C.

The high pressure injection nozzles for the two components are both biassed for an opening and closing pressure of 80 atm. gauge. With the commencement of the measuring operation, the pressure build-up (1/I and 1/II) of the Components I and II takes place substantially synchronously as a function of time with simultaneous opening of the injection nozzles until the respective full pressure levels are obtained. The working pressure of the highly viscous Component I, a larger quantity of which is supplied, reaches 222 atm. gauge for the measuring period 2, while the working pressure of the Component II, which is of lower viscosity and smaller in quantity, reaches 100 atm. gauge for the measuring period 3.

Heretofore, on completing the charging period, i.e. on stopping the apparatus, the pressure drop for the highly viscous Component I takes place according to the branch 4 of the curve, and according to the curve branch 5 for the component of low viscosity, so that the closing of the nozzle at 80 atm. gauge for the highly viscous Component I supplied in larger quantity takes place with a time lag compared with the closing of the nozzle of the low viscosity Component II supplied in smaller qunatity. This latter nozzle has the same opening and closing pressure as the nozzle for Component I because it is desired to synchronize the time of opening the nozzles at the commencement of the cycle. This means that due to the closing of the injection nozzle for Component I occurring with a time lag at the end of the mixing process, a small quantity (for example 0.1 to 0.5 cc.) of Component I remains in the injection duct and thus a slight inaccuracy in the required recipe is present at the end of the mixing process. This inaccuracy would lead to a residue of polyether in the molded element consisting of foam material.

This defect is overcome in accordance with the present invention by the fact that the pressure drop of the low viscosity Component II (toluylene diisocyanate) can be retarded to such a degree by a controllable relief valve that the closing pressure for both injection nozzles becomes effective at the same time. The modified pressure drop of Component II is shown in the curve 6 of FIGURE 1. The pressure-drop curves 4 and 6 of both components intersect one another at 80 atm. gauge at a common point P. A residue-free completion of the measurement of quantities is produced by synchronized closing of the injection nozzles for both components. If this working diagram as shown in FIGURE 1 is maintained, it now becomes possible to start the next working cycle without passing a cleansing impulse of compressed air through the mixing duct and without jeopardizing the quality of the molded article or of a covering layer due to an inaccuracy in the recipe when restarting the apparatus.

In order that the delaying of the pressure drop of Component II can be reliably controlled and easily manipulated, using the same measuring apparatus, even with recipes other than those referred to and comprising other ratios for the component quantities (e.g. 100/100=I/II) or component viscosities (e.g. 1000/150=I/II), such as can exist for example as regards semihard or hard polyurethane foam materials, there is employed a relief valve (FIGURE 2) which is controlled in the working cycle and is constructed as a rotary slide valve.

In FIGURE 2 the cross-section of the relief opening 7 is regulated by the adjustable control edge 8 for the recipe actually being used. At the end of the charging period and simultaneously with the stoppage of the driving motors of the pumps, the preferably electro-pneumatically controlled eccentric disc 9 is set in operation automatically, for example via the cut-off means of the pumps. By means of the control rod 10, the disc 9 displaces the control edge 8 until it uncovers the required relief opening 7, so that the relay relief of the delivery output through the valve inlet 11 can be obtained. Such a valve can be provided for the delivery of each component. After completing the relief periods adjusted for the separate valves, the time-controlled relief valves again close automatically and the next working cycle, (i.e. mixing period in this case) can commence. The relief opening 7 is adjusted by the adjustable stop 10a of the regulating rod 10.

The pressure drop delay of Component II can additionally be effected in such a way that by means of a contact pressure transmitter fitted into the delivery pipe of Component I, an automatically delayed actuation of the relief valve for Component II is produced at for example 120 atm. gauge (see point 4a in the descending branch of curve 4 of Component I in FIGURE 1), so that once again the nozzle closing pressure of 80 atm. gauge is reached at the same time for the components supplied in different quantities and with different viscosities, the pressure drop for Component II taking place in accordance with a curve of greater inclination. In FIGURE 1, such a curve for Component I is shown as a dotted line and bears the reference 6a.

Relief valves controlled in such a manner can be used for both components in order thereby to obtain a greater range of variation of the synchronous pressure drop for the different recipes being used and types of components which differ as regards viscosity and quantity.

A reliable control of the pressure build-up and pressure drop synchronized as a function of time and shown in FIGURE 1 is further assisted if the delivery means for the components are of identical nature, that is to say, only high pressure piston pumps or only high pressure gear wheel pumps are used.

Another means for obtaining very short times for the commencement and end of injection consists in that the mechanical coupling of the pumps is effected by way of a single driving motor or coupled motors. By this means, the result obtained is that the delivery pumps are mutually influenced by the different acceleration or deceleration for the commencement and end of the measuring operation, caused by different viscosities and quantities of the components.

A view of the complete apparatus according to the invention is shown diagrammatically in FIGURE 3. A polyether-activator mixture (Component I) of relatively high viscosity is for example contained in a storage vessel 12 which is capable of being heated and which is fitted with a stirring device 13, a contact thermometer 14 and a compressed air safety valve 15. Under a compressed air pressure of for example 2 atm. gauge, the mixture is supplied through the pipe 16 to the suction chamber 17 of the heatable high-pressure piston pump 18. The storage vessel 19, which can be heated and is fitted in the same way as vessel 12 with a contact thermometer 14, safety valve 15 and stirring device 13, and contains the low viscosity Component II (for example toluylene diisocyanate) under a container pressure of for example 1 atm. gauge. Component II is supplied to the suction chamber 21 of the heatable high pressure piston pump 22 by way of the delivery pipe 20, which if required can be heated. The delivery pumps 18 and 22 are actuated by a common driving motor 23. With the controllable relief valves 24 and 25 in the "closed" position, the pumps 18 and 22 are started and the Components I and II are fed through the collection chambers 26 and 27 of the pumps 18 and 22 to the heatable high pressure hoses 28 and 29, which can be up to a length of 20 meters. These feed the components to the portable mixing head 30 at the pressure of 220 atm. gauge and 100 atm. gauge for the Components I and II, respectively (according to the recipe example which is given), these pressures being plotted in FIGURE 1. The homogenized reaction mixture is discharged while still fluid and in the quantity controlled according to the timing mechanism 33 by way of the discharge pipe 31 into the mold 32 in which it foams to form the required molding 34 conforming to the shape of the mold. If the apparatus is out of action for a relatively long time, the mixing chamber which is arranged inside the mixing head and which has very small dimensions (not shown) can be cleansed by compressed air, which is automatically supplied by way of the compressed air pipe 36 from a compressor (not shown) to the mixing head 30 in accordance with the operating cycle. The mixing head 30 is provided with a handle 41 and a switch 42 for operating the device manually.

For components which react quickly, it is important to use the smallest possible mixing chambers. The provision of an extremely small mixing chamber is only possible if residue-free measurement of the quantities of material are provided. A mixing device as described in U.S. Reissue Patent 24,514 or in copending application Serial Number 657,319, now Patent No. 3,073,533 of January 15, 1963, may be used herein.

In order to obtain the necessary time-synchronized reduction in the working pressures of the Components I and II, there is an equally timed closing of the injection nozzles 37 and 38 in the mixing head 30 at the selected nozzle-closing pressure of 80 atm. gauge (see FIGURE 1). Each nozzle 37 and 38 includes a pressure responsive valve having means for adjusting the pressure at which it opens and closes. For this purpose, the controllable relief valves 24 and 25 constructed according to FIGURE 2 open automatically by the action of eccentric disc 9 on the regulating rod 10 into the return pipes 45 and 46 (see FIGURE 3) at the same time as the driving motors are stopped. The return pipes communicate with the containers 12 and 19 so that the pressure can be lowered to the actual container pressures and the apparatus can be again brought to the initial pressures for the new cycle.

The pressure of the low viscosity liquid is maintained above the closing pressure of the injection nozzle by means of the pressure relief valve 25 which has the construction as shown in FIGURE 2. This valve 25 is adjusted by means of the adjustable stop 10a to maintain the pressure within line 29 above the closing pressure of the injection nozzle for a period of time equal to the time necessary for the pressure in line 28 which carries the high viscosity components to be reduced to the pressure at which the injection nozzle closes when the controllable relief valve 24 is completely opened. That is, when the motor 23 is stopped by the control 33, the controllable relief valves 24 and 25 are open a predetermined amount to permit the pressure in line 29 to fall gradually while the pressure in line 28 falls rapidly in comparison to that in line 29. It can, therefore, be seen that any different viscosity liquids or different liquids under different pressures other than those of this example can be mixed in the apparatus of this invention without any of one ingredient being left in the mixing device merely by adjusting the adjustable stops 10a of the relief valves 24 and 25.

The injection nozzles for each of the components 37 and 38 may be simultaneously closed by delaying the actuation of the relief valve for Component II with respect to the switching time of the relief valve of Component I. This can be accomplished as described by contact manometer 26a installed in the pressure pipe or in the pump connecting the pipe of Component I. This is shown, for example, for 120 atm. gauge pressure in the descending branch (point 4a, FIGURE 1) of the pressure-drop curve of the Component I. In FIGURE 3, a manometer 27a is fitted on the pressure side of the Component II to complete the installation of the pressure pipe or the pump collecting pipe 27. The relief valves 24 and 25 are opened to the extent determined by the adjustable stop 10a in response to the manometers 26a and 27a respectively. This enables the same apparatus to be used for a converse working pressure ratio of the Components I and II, which ratio can be caused by varying the viscosity and quantity ratios of the components.

By causing interruptions in the piston pumps 18 and 22 or in the injection nozzles 37 and 38, the excess pressure valve 47 or 48 responds and suddenly relieves the entire high pressure delivery system. That is to say, the pumps 18 and 22 and the delivery pipes 28 and 29 are relieved from possibly super-atmospheric pressures of 250 atm. gauge. The actual excess quantity is discharged into the collecting container 50.

The maximum output of a high pressure piston pump (in cc./min.) is dependent on the viscosity of the component to be conveyed. To guarantee the functioning of the pumps for full output of a selected pump, the viscosity of the polyether or polyester component (Component I) should be at a maximum of 1000 cps. It is possible to obtain the desired viscosity in an emergency by heating (for example up to 80° C.) the entire machine side for supply and delivery of the Component I. Especially when preparing hard polyurethane foam materials, polyesters of very high viscosity are employed and cannot be delivered (in spite of a temperature rise of up to for example 50° C.) by the selected piston pump for the desired maximum discharge output. In order to obtain the chosen discharge output in this case, the high pressure piston pump 18 can be replaced by a high pressure gear wheel pump (not shown) coupled to the pump 22 through the motor 23.

The construction of the other machine elements remains the same in this case, so that the desired residue-free measuring process can be achieved.

It is to be understood that the apparatus of this invention may be used for mixing measured quantities of any liquid, however, this apparatus and method are particularly suitable for use in the production of plastics and more particularly in the production of plastic products based on the polyaddition, polycondensation or polymerization reactions. The apparatus of this invention finds use in the preparation of polyurethane plastics where intermittent molding of articles is to be performed. It is possible to combine the reaction components with liquid protective agents such as flame proofing agents, termite protective agents and the like. Also, it is possible in the production of foamed material to use low boiling liquids such as halogen hydrocarbons and gaseous components.

The polyurethane plastics referred to herein can, of course, be prepared by reacting organic compounds containing active hydrogen containing groups with an organic polyisocyanate. Any suitable organic compound containing active hydrogen containing groups such as, for example, hydroxyl polyesters, polyhydric polyalkylene ethers, polyhydric polythioethers, polyester amides and polyacetals may be used.

Any suitable hydroxyl polyesters may be used in the preparation of polyurethane plastics such as the reaction product of a polycarboxylic acid and a polyhydric alcohol. Any suitable polycarboxylic acid may be used such as, for example, succinic, oxalic, adipic, methyl adipic, sebacic, glutaric, pimelic, azelaic, suberic, phthalic, terephthalic, isophthalic, 1,2,4-benzene tricarboxylic, triodiglycollic, thiodipropionic, maleic, fumaric, itaconic, citraconic or mixtures thereof. Any suitable polyhydric alcohol may be used such as, for example, ethylene glycol, propylene glycol, butylene glycol, amylene glycol, 1,6-hexanediol, trimethylol propane, pentaerythritol and the like.

Any suitable polyester amide may be used in the preparation of polyurethane plastics such as, for example, the reaction product of an amine or amino alcohol with a polycarboxylic acid. Any suitable amine such as ethylene diamine and propylene diamine and the like may be used. Any suitable amino alcohol such as, for example, β-hydroxy ethyl amine and the like may be used. Any suitable polycarboxylic acid such as those disclosed above with relation to the preparation of hydroxyl polyesters may be used.

Any suitable polyhydric polyalkylene ether may be used in the preparation of a polyurethane plastic such as, for example, the condensation product of alkylene oxides with a small amount of a compound containing active hydrogen containing groups such as, for example, water, ethylene glycol, propylene glycol, butylene glycol, amylene glycol, trimethylol propane, glycerine, pentaerythritol, hexanetriol and the like. Any suitable alkylene oxide condensate may be used such as, for example, ethylene oxide, propylene oxide, butylene oxide, amylene oxide or mixtures thereof. The polyhydric polyalkylene ethers may be prepared by any known process such as the process described by Wurtz in 1859 in the "Encyclopedia of Chemical Technology," volume 7, pages 257 to 262, published by Interscience Publishers Inc. (1951), or in U.S. Patent 1,922,459.

Any suitable polyhydric polythioether may be used in the preparation of polyurethane plastics such as, for example, the reaction product of one of the aforementioned alkylene oxides used in the preparation of the polyhydric polyalkylene ethers with a polyhydric thioether such as, for example, thiodiglycol, 3,3'-dihydroxypropylene sulfide, 4,4'-dihydroxybutylene sulfide, 1,4-(β-hydroxyethyl) phenol dithioether and the like.

Any suitable polyacetal may be used in the preparation of polyurethane plastics such as, for example, the reaction product of an aldehyde with a polyhydric alcohol. Any suitable aldehyde may be used such as, for example, formaldehyde, paraldehyde, butraldehyde and the like. Any of the polyhydric alcohols mentioned above in the preparation of polyesters may be used.

Any suitable organic polyisocyanate or polyisothiocyanate may be used in the preparation of polyurethane plastics such as, for example, those disclosed in U.S. Reissue Patent 24,514. Also any of the following organic polyisocyanates and polyisothiocyanates may be used such as, for example, hexamethylene diisocyanate, 2,4-toluylene diisocyanate, 4,4'-diphenyl methane diisocyanate, 4,4'-diphenyl dimethyl methane diisocyanate, 4,4',4''-triphenyl triisocyanate, 2,4,6-triisocyanato-s-triazine, xylylene diisocyanates, 2,6-toluylene diisocyanate, 1,5-naphthylene diisocyanate, 1-methyl-2,4-diisocyanato-5-chlorobenzene, 1-methyl-2,4-diisocyanato-cyclohexane, 1-methyl-2,4-diisocyanato-5-nitrobenzene, m-phenylene diisocyanate, p-phenylene diisocyanate, 1,4-naphthylene diisocyanate, the corresponding polyisothiocyanates and the like.

Of course, polyurethane plastics have found widespread utility in the form of elastomeric rubber-like products and in the form of cellular products. The elastomeric products find widespread use as substitutes for rubber because of their improved properties. Cellular products have found widespread use in the furniture industry and also in the automotive industry. Foamed materials made by the process and in the apparatus of this invention have the following advantages:

(1) The production of foam materials with best possible uniformity as regards pore structure.

(2) The sprayed foam materials are free from losses and free from blow-holes and cracks.

(3) A continuous or intermittent production of block or sandwich plates from foam materials with a plurality of stationary hand nozzles can also be assembled from a group apparatus consisting of the component devices according to FIGURE 3. The reaction mixture can be homogenized at extremely high speed and discharged, usually in a very liquid form, from the hand nozzle to merge into one another by applying in zones to a conveyor belt, so that blocks or core layers of uniform height and density are formed over the width of the conveyor belt.

Although the invention has been described in considerable detail, it is, of course, to be understood that variations may be made by those skilled in the art such as in the installation illustrated in FIGURE 3, for a discharge output of the mixture of for example, 3–20 kg./min., can be adapted according to the selected size of the delivery pumps for discharge capacities of 300 to 1000 g./min. (small apparatus) or for outputs up to 60 kg./min. or larger (larger apparatus).

Also it is more expedient when working with larger measurement capacities (for example 40, 60, 80 or 100 kg./min.) if for example the supply containers 12 and 19 are enlarged from capacities of 50 liters to capacities of 500 liters or higher and if these large containers are served by 2 or more machine systems according to FIGURE 3, operating in parallel with the associated two or more mixing heads 30. Such an assembly of machine groups is especially valuable when for example large-area light-weight core sandwich constructions are to be quickly foamed.

Due to the residue-free measuring process, the mixing heads 30 can be connected directly to the rest of the apparatus and the reaction mixture can be operated without fore-runnings or after-runnings. This can for example be done by means of ball-and-spring valves, which close automatically when the apparatus is stopped and thus seal off the hollow elements to be foamed with respect to the foaming pressure being set up. This group apparatus is operated by a press-button circuit and timing mechanism.

Provision is made for the apparatus according to the invention to be mounted on lorries or other suitable special vehicles, for example for foaming in situ (insulations of all types in the construction of houses, factories and ships).

As regards the functioning of the apparatus according to the invention, the motor or motors coupled to the coupled pumps can be controlled by switching on and off manually or automatically (program control). Also, with continuously running motors and delivery pumps, the control rods of the piston pumps can for example be pneumatically or electromagnetically brought at the start of the measuring operation from the delivery position to the required operating position and, on completing the measuring operation, back to the delivery position.

With the latter process, the components being mixed are moved in a cyclic process. This method is only used in temperature-insensitive reactions so as to ensure reliable operation of the measuring apparatus, since heating occurs with cyclic processes.

For the study of recipes and for obtaining a relatively large latitude as regards recipes for manufacture on a large scale, it is frequently of interest to combine more than two components. In this case, it is for example possible to adopt two methods for the measuring apparatus according to the invention:

(a) Using a three-component system, for example polyether, toluylene diisocyanate and activator mixture, the apparatus can be operated with three separate containers and three pumps coupled to one motor. The measured components are separately supplied to a triple injection duct. In other respects, the process according to the invention for the synchronized progress of the working diagram for a residue-free discharge of the complete reaction mixture is applicable for all components.

(b) Alternatively, a mixing chamber driven by a motor and serving for the initial mixing of for example polyether with the activator can be interposed for this purpose between the polyether container 12 and the delivery pump 16.

In this case, on relieving the pressure, the delivery output of the combined components (for example polyether and activator) are relieved in a separately arranged collecting container. The cyclic process described above cannot be used for this purpose.

What is claimed is:

1. In an apparatus for mixing ingredients which comprises a storage vessel for each of said ingredients, a pumping means connected to the outlet of each of said storage vessels for delivering each of said ingredients under predetermined different pressures to a mixing chamber, said mixing chamber having a pressure-operable valved injection nozzle for each of said ingredients, each of said pressure-operable valved nozzles being adjusted to open and close at the same predetermined pressure, each of said pumping means being in the line between a respective one of said storage vessels and a respective one of said pressure sensitive valved nozzles, the improvement which comprises a means for adjusting the pressures in the lines between said pumping means and said pressure sensitive valved nozzles so said pressure sensitive valved nozzles close simultaneously.

2. In an apparatus for mixing ingredients having different viscosities which comprises a storage vessel for each of said ingredients, a pumping means connected to the outlet of each of said storage vessels for delivering each of said ingredients under predetermined different pressures to a mixing chamber, said mixing chamber having a pressure-operable valved injection nozzle for each of said ingredients, each of said pressure-operable valved nozzles being adjusted to open and close at the same predetermined pressure, each of said pumping means being in the line between a respective one of said storage vessels and a respective one of said pressure sensitive nozzles the improvement which comprises a means for simultaneously opening and closing said pressure sensitive valved nozzles for each of said ingredients, said means including a motor mechanically connected to each of said pumping means for driving said pumping means, a recycling means disposed between the outlet of each of said pumping means and the respective line connecting said respective storage vessels with said corresponding pumping means, an adjustable relief valve disposed within each of said recycling means, each of said relief valves being operable in response to the initiation and termination of operation of said motor, each of said relief valves being in the closed position when said motor is in operation, means for adjusting the extent of opening of said relief valves so that the pressure in the line in back of each of said valved nozzles reaches said predetermined opening and closing pressure at precisely the same point in time.

3. An apparatus for simultaneously closing a plurality of pressure-sensitive valved injection nozzles which open and close at the same pressure and are arranged for introducing a plurality of ingredients into a mixing chamber at different pressure differentials above said opening and closing pressure which comprises a means for gradually reducing the pressure of the ingredients having the smallest pressure differential, a means for more rapidly reducing the pressure of the ingredient having the larger pressure differential so the pressure differential of each ingredient reaches zero at the same time causing the closing of the valved nozzles.

4. In an apparatus for mixing measured proportions of different ingredients having different viscosities, said ingredients being introduced into a mixing apparatus under substantially different pressures which comprises a storage means for each of said ingredients, a mixing chamber having a pressure-sensitive valved injection nozzle for each of said ingredients, said valved injection nozzles being adjusted to open and close at the same pressure and arranged therein for introducing said ingredients into said mixing chamber and a pumping means disposed in the line of each ingredient between said storage means and the appropriate valved injection nozzle for conveying said ingredient from said storage means to said mixing chamber under a predetermined pressure above said opening and closing pressure of said nozzles, which predetermined pressure is different for each ingredient, the improvement which comprises a means responsive to the termination of the pumping action of said pumps for causing the pressure versus time curves for each of said ingredients to intersect at the closing pressure of said valved injection nozzles.

5. In an apparatus for mixing measured proportions of different ingredients having different viscosities, said ingredients being introduced into a mixing apparatus under substantially different pressures which comprises a storage means for each of said ingredients, a mixing chamber having a pressure-sensitive valved injection nozzle for each of said ingredients, said valved injection nozzles being adjusted to open and close at the same pressure and arranged therein for introducing said ingredients into said mixing chamber and a pumping means disposed in the line of each ingredient between said storage means and the appropriate valved injection nozzle for conveying said ingredient from said storage means to said mixing chamber under a predetermined pressure above said opening and closing pressure of said nozzles, which predetermined pressure is different for each ingredient, the improvement which comprises a return pipe disposed between the suction and pressure side of each of said pumps, a pressure relief valve constructed as a rotary side valve disposed in each of said return pipes, a means responsive to the switching off of said pumps for opening each of said pressure relief valves a different predetermined amount so the pressure of each of said ingredients to said valved injection nozzles reaches the closing pressure of said nozzles at precisely the same time.

6. In an apparatus for mixing measured proportions of different ingredients having different viscosities, said ingredients being introduced into a mixing apparatus under substantially different pressures which comprises a storage means for each of said ingredients, a mixing chamber having a pressure-sensitive valved injection nozzle for each of said ingredients, said valved injection nozzles being adjusted to open and close at the same pressure and arranged therein for introducing said ingredients into said mixing chamber and a pumping means disposed in the line of each ingredient between said storage means and the appropriate valved injection nozzle for conveying said ingredient from said storage means to said mixing chamber under a predetermined pressure above said opening and closing pressure of said nozzles, which predetermined pressure is different for each ingredient, the improvement which comprises a return pipe disposed between the suction and pressure side of each of said pumps, a pressure relief valve disposed in each of said return pipes, a means responsive to the switching off of said pumps for opening each of said pressure relief valves a different predetermined amount so the pressure of each of said ingredients to said valved injection nozzles reaches the closing pressure of said nozzles at precisely the same time.

References Cited in the file of this patent

UNITED STATES PATENTS

| | | |
|---|---|---|
| 2,142,062 | Thurman | Dec. 27, 1938 |
| 2,724,581 | Pahl et al. | Nov. 22, 1955 |
| 2,764,565 | Hoppe et al. | Sept. 25, 1956 |
| 2,814,471 | Carr et al. | Nov. 26, 1957 |
| 2,885,268 | Breer et al. | May 5, 1959 |
| 2,894,732 | Taber et al. | July 14, 1959 |
| 2,958,516 | Wall et al. | Nov. 1, 1960 |

UNITED STATES PATENT OFFICE
CERTIFICATE OF CORRECTION

Patent No. 3,122,164                                        February 25, 1964

Erwin Weinbrenner et al.

It is hereby certified that error appears in the above numbered patent requiring correction and that the said Letters Patent should read as corrected below.

Column 2, lines 68 and 69, after "component" insert -- during the pressure drop of the high pressure component --; column 4, line 24, for "relay" read -- delay --; column 10, line 45, for "side" read -- slide --.

Signed and sealed this 22nd day of September 1964.

(SEAL)
Attest:

ERNEST W. SWIDER                                         EDWARD J. BRENNER
Attesting Officer                                           Commissioner of Patents